United States Patent
Wolf et al.

(10) Patent No.: US 12,370,694 B2
(45) Date of Patent: Jul. 29, 2025

(54) GRIP DETECTION SYSTEM FOR LIQUID HANDLING ROBOT

(71) Applicant: Takeda Pharmaceutical Company Limited, Osaka (JP)

(72) Inventors: Ádám Wolf, Lexington, MA (US); Paul Majneri, Lexington, MA (US)

(73) Assignee: Takeda Pharmaceutical Company Limited, Osaka (JP)

(\*) Notice: Subject to any disclaimer, the term of this patent is extended or adjusted under 35 U.S.C. 154(b) by 191 days.

(21) Appl. No.: 18/007,492

(22) PCT Filed: Jul. 31, 2020

(86) PCT No.: PCT/US2020/044547
§ 371 (c)(1),
(2) Date: Jan. 31, 2023

(87) PCT Pub. No.: WO2022/025924
PCT Pub. Date: Feb. 3, 2022

(65) Prior Publication Data
US 2023/0278234 A1 Sep. 7, 2023

(51) Int. Cl.
*G01N 35/04* (2006.01)
*B25J 9/00* (2006.01)
(Continued)

(52) U.S. Cl.
CPC .......... *B25J 13/081* (2013.01); *B25J 9/0096* (2013.01); *B25J 9/1653* (2013.01); *B25J 9/1679* (2013.01); *B25J 13/089* (2013.01); *B25J 19/021* (2013.01)

(58) Field of Classification Search
CPC ...... B25J 13/081; B25J 9/0096; B25J 9/1653; B25J 9/1679; B25J 13/089; B25J 19/021;
(Continued)

(56) References Cited

U.S. PATENT DOCUMENTS

| 6,257,091 B1\* | 7/2001 | Cohen ..................... B67B 7/182 81/3.39 |
| 2003/0215360 A1 | 11/2003 | Ruddock |

(Continued)

FOREIGN PATENT DOCUMENTS

| EP | 0114686 A2 | 8/1984 |
| JP | H11295323 A | 10/1999 |

(Continued)

OTHER PUBLICATIONS

International Search Report and Written Opinion dated Apr. 19, 2021 from corresponding PCT Application No. PCT/US2020/044547.

(Continued)

*Primary Examiner* — Adam R Mott
*Assistant Examiner* — Byron Xavier Kasper
(74) *Attorney, Agent, or Firm* — HONIGMAN LLP

(57) ABSTRACT

A liquid handling robot has a worktable that supports a rack holding a set of pipette tips. The liquid handling robot also has an arm that is operably suspended above the worktable, where the arm includes a tip receiver that is configured to engage the set of pipette tips. A controller of the liquid handling robot is configured to raise the tip receiver away from the worktable to withdraw the engaged set of pipette tips from the rack. A sensor is fixed relative to the worktable and is operable to emit a beam. A microcontroller monitors the sensor with the arm in a checking position to determine if the rack interrupts in the beam to indicate that the rack stuck to the pipette tips, which is autonomously resolved by the liquid handling robot performing a corrective action.

28 Claims, 9 Drawing Sheets

(51) Int. Cl.
*B25J 9/16* (2006.01)
*B25J 13/08* (2006.01)
*B25J 19/02* (2006.01)
*G01N 35/00* (2006.01)
*G01N 35/10* (2006.01)

(58) Field of Classification Search
CPC ..... B25J 9/00; B25J 9/16; B25J 9/1674; B25J 9/1697; B25J 9/1694; B25J 13/08; B25J 19/022; B25J 19/02; G01N 2035/0491; G01N 35/00712; G01N 35/0099; G01N 35/1011; G01N 2035/103; G01N 2035/1013; G05N 35/00; B65B 2210/12
See application file for complete search history.

(56) References Cited

U.S. PATENT DOCUMENTS

| | | | |
|---|---|---|---|
| 2005/0124059 A1 | 6/2005 | Kureshy et al. | |
| 2006/0242785 A1* | 11/2006 | Cawley | B65G 47/91 15/321 |
| 2009/0293643 A1 | 12/2009 | Powell et al. | |
| 2014/0107953 A1* | 4/2014 | Mueller | G01F 23/2962 702/54 |
| 2014/0202859 A1* | 7/2014 | Coope | G01N 27/44721 204/461 |
| 2014/0260696 A1* | 9/2014 | Criswell | G01B 11/14 422/511 |
| 2015/0209961 A1* | 7/2015 | Komatsu | B25J 9/1676 901/49 |
| 2019/0195901 A1* | 6/2019 | Iwasaki | G01N 35/0099 |
| 2019/0197676 A1* | 6/2019 | Yoshida | G06T 7/74 |
| 2020/0269429 A1* | 8/2020 | Chavez | B25J 15/0616 |
| 2021/0053230 A1* | 2/2021 | Mizoguchi | B25J 19/023 |
| 2021/0299876 A1* | 9/2021 | Vepakomma | B25J 9/1692 |

FOREIGN PATENT DOCUMENTS

| | | |
|---|---|---|
| JP | 2004317321 A | 11/2004 |
| JP | 2010210599 A | 9/2010 |

OTHER PUBLICATIONS

Wolf et al., "Detecting Gripping Failure in a Liquid Handling Robot with a Break Beam Sensor" 2020 IEEE 18th International Symposium on Intelligent Systems and Informatics, Sep. 17, 2020, pp. 101-106.

Extended European Search Report from corresponding European patent application No. 20947731.4, dated Apr. 19, 2024.

* cited by examiner

GRIP DETECTION SYSTEM FOR LIQUID HANDLING ROBOT

This application claims priority to PCT Application No. PCT/US2020/044547, filed Jul. 31, 2020. The disclosure of this prior application is considered part of the disclosure of this application and is hereby incorporated by reference in its entirety.

TECHNICAL FIELD

This disclosure relates to liquid handling robots, such as liquid handlers having gripping devices for picking up pipetting tips and tubes in a laboratory.

BACKGROUND

Besides their main function of pipetting, liquid handling robots perform complex tasks that include manipulating plates and tubes, as well as automatically changing the disposable pipetting tips. During the execution of these tasks, mechanical errors may occur, such as unsuccessful gripping and jamming. To prevent such an error to cause damage to the equipment, further execution of successive steps of a task may be conditional to whether a manipulation step was successful or not. For example, a liquid handler may be programmed to display a user prompt and to wait for confirmation from a human after a manipulation step that is problematic or otherwise prone to failure. Human intervention and observation of such tasks requires in that liquid handling robots run these tasks during working hours, which reduces efficiency, prevents robotic operation outside of human working hours, and can result in damage.

SUMMARY

One aspect of the disclosure provides a liquid handling robotic system that has a station structure with a worktable that is configured to support a liquid container, such as a well plate, tube, or the like. A rack that holds a set of pipette tips is disposed at a home position in the station structure. A liquid handling robot is coupled to the station structure and has an arm suspended above the worktable, where the arm includes a tip receiver that is configured to engage a set of pipette tips from a rack. A controller of the liquid handling robot is configured to control movement of the arm relative to the worktable, such that the controller is configured to move the arm to a position above the rack. In this position, the controller can control the liquid handling robot to engage the tip receiver with the set of pipette tips held in the rack, and then raise the tip receiver away from the home position to withdraw the engaged set of pipette tips from the rack. The controller can then control the liquid handling robot to move the engaged set of pipette tips to the liquid container to draw liquid from the liquid container into at least one tip of the set of pipette tips engaged with the tip receiver.

In some instances, the set of pipette tips engaged with the tip receiver can frictionally engage the rack when being withdrawn, causing the rack to be held by the tips in a jammed condition. The liquid handling robotic system in one aspect of the disclosure provides a sensor that is configured to emit a beam and sense interruptions to the beam. The sensor may be coupled to the station structure or the arm of the liquid handling robot. After the tip receiver engages the set of pipette tips held in the rack and the engaged tips are raised from the home position, the beam is positioned to contact the rack in the jammed condition. A microcontroller is coupled with the sensor and the controller of the liquid handling robot, where the microcontroller is configured to monitor the sensor to determine if the rack is in the jammed condition or a cleared condition where the beam is uninterrupted by the rack. In response to determining that the rack is in the jammed condition, the microcontroller is configured to direct or signal to the liquid handling robot to perform a corrective action to disengage the rack from the tip receiver.

Implementations of the disclosure may include one or more of the following optional features. In some implementations, the sensor is an infrared sensor or an ultrasonic sensor. For example, the sensor may include an infrared break-beam sensor that has an emitter configured to emit the beam and a photoelectric receiver configured to receive the beam. The microcontroller may be configured to receive analog or digital signals from the sensor. Also, the microcontroller may interface with an executable script that operates and communicates with the controller of the liquid handling robot.

In some implementations, the controller is configured to move the tip receiver to a checking position relative to the beam for the microcontroller to monitor the sensor and determine if the rack is in the jammed condition or the cleared condition. The microcontroller may monitor the sensor for a select number of iterations with the tip receiver held in the checking position. In some examples, the worktable has an opening that exposes a cavity, where the sensor is positioned for the beam to extend across the opening, such that the arm may lower the plurality of pipette tips at least partially into the cavity to determine if the rack is in the jammed condition.

The rack holding the set of pipette tips engaged by the tip receiver may be disposed in a stack of racks. In some examples, the worktable has a location that defines a loading area that holds the stack of racks, where the rack having the set of pipette tips may be disposed on top of the stack of racks in the home position. The corrective action may include returning the rack to the loading area. For example, the corrective action may include disengaging the set of pipette tips from the tip receiver, reengaging the set of pipette tips with the tip receiver, and again raising the tip receiver to withdraw the reengaged set of pipette tips from the rack.

Another aspect of the disclosure provides a liquid handling robotic system that includes a frame disposed at a worktable and a liquid testing assembly disposed in a home location at the worktable. The liquid testing assembly has a first component and a second component that is engaged with the first component, where the liquid testing assembly disposed in a home location at the worktable. A liquid handling robot is operably coupled to the frame and has a controller and an arm operable to move relative to the worktable in response to commands from the controller. The arm includes an engagement device that is configured to engage the first component of the liquid testing assembly. The controller is configured to control the engagement device to engage the first component in the home location and control the arm to move the engaged first component away from the home location. A sensor is configured to emit a field and sense interruptions to the field. The sensor is coupled to the frame, the worktable, or the arm of the liquid handling robot and is positioned to sense the presence of the second component when it remains engaged with the first component after the arm moves the first component away from the home location. A microcontroller is coupled with the sensor and the controller of the liquid handling robot.

The microcontroller is configured to monitor the sensor to determine an error condition when the second component is sensed in engagement with the first component or a cleared condition where the second component is not sensed. In response to a determined error condition, the microcontroller is configured to direct the liquid handling robot to iteratively perform a corrective action to disengage the second component from the first component for the lesser of a set number of iterations or until a cleared condition is determined by the microcontroller. In some examples, the first component is a filter tube and the second component is a centrifugal tube. In other examples, the first component is a pipette tip and the second component is a rack.

This aspect may include one or more of the following optional features. In some implementations, the corrective action provides disengaging the first component, reengaging the first component, and directing the microcontroller to check if an error condition is still present. The set number of iterations may be less than 10, such as 5. To determine if an error condition is present, such as a jammed condition, the microcontroller may perform several checks, such as a first measurement sequence with the arm holding the first component in a first position relative to the sensor for a set period of time and a second measurement sequence with the arm holding the first component in a second position relative to the sensor for a set period of time. The microcontroller may monitor the sensor for the first and second measurement sequences and determines an error condition if the second component is sensed in the first or second measurement sequence. For example, when the microcontroller receives a signal from the sensor below a threshold value, the signal is indicative of the second component erroneously engaged to the first component to provide an error condition.

In some implementations, the sensor includes an infrared sensor, an ultrasonic sensor, an inductive sensor, or a capacitive sensor. The sensor may, for example, include an emitter that is configured to emit a light beam and a photoelectric receiver that is configured to receive the light beam. The emitter is configured to be positioned for the light beam to be adjacent to the first component when engaged with the engagement head and to be interrupted by the second component when the first component is engaged with the second component. In some examples, the sensor is fixed relative to the frame, where the arm moves the first component engaged with the engagement device to a checking position with the light beam arranged to contact the second component in an error condition. When determining whether the second component is in the error condition, the microcontroller may monitor the sensor for a predefined time with the engagement head in the checking position.

Yet another aspect of the disclosure provides a system that has a liquid handling robot having a worktable that is configured to support a rack holding a set of pipette tips. The liquid handling robot also has an arm that is operably suspended above the worktable, where the arm includes a tip receiver that is configured to engage the set of pipette tips. The liquid handling robot further includes a controller that is configured to control movement of the arm relative to the worktable to a position above the rack, control the tip receiver to engage the set of pipette tips held in the rack, and raise the tip receiver away from the worktable to withdraw the engaged set of pipette tips from the rack. A sensor is fixed relative to the worktable and is operable to emit a beam. The sensor is configured to sense interruptions in the beam. A microcontroller is coupled with the sensor and the controller of the liquid handling robot, such that the microcontroller is configured to: (i) determine when the arm is moved to a checking position that locates the beam in an area between an adjacent pair of the set of pipette tips engaged with the tip receiver; (ii) monitor the sensor with the arm in the checking position to determine if the rack interrupts in the beam to indicate a jammed condition of the rack; and (iii) in response to determining that the rack is in the jammed condition, direct the liquid handling robot to perform a corrective action to disengage the rack from the set of pipette tips.

In some implementations, the corrective action includes releasing the set of pipette tips from the tip receiver over the rack, reengaging the set of pipette tips from the rack with the tip receiver, and checking if an error condition is still present. The corrective action may include iteratively releasing and reengaging the set of pipette tips with the tip receiver for the lesser of a set number of iterations or until the rack is no longer sensed in a jammed condition. For example, the microcontroller monitors the sensor with the arm in the checking position for a select number of iterations. When the microcontroller receives a signal from the sensor below a threshold value, the signal may be indicative of rack being in a jammed condition.

In some implementations, the sensor includes an infrared sensor. For example, the sensor is an infrared break-beam sensor that has an emitter configured to emit the beam and a photoelectric receiver configured to receive the beam. The worktable may include an opening exposing a cavity, where the sensor may be positioned for the beam to extend across the opening in the cleared condition. The worktable may also or alternatively include a loading area that holds a stack of racks, where the rack having the set of pipette tips is disposed at a top of the stack of racks.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
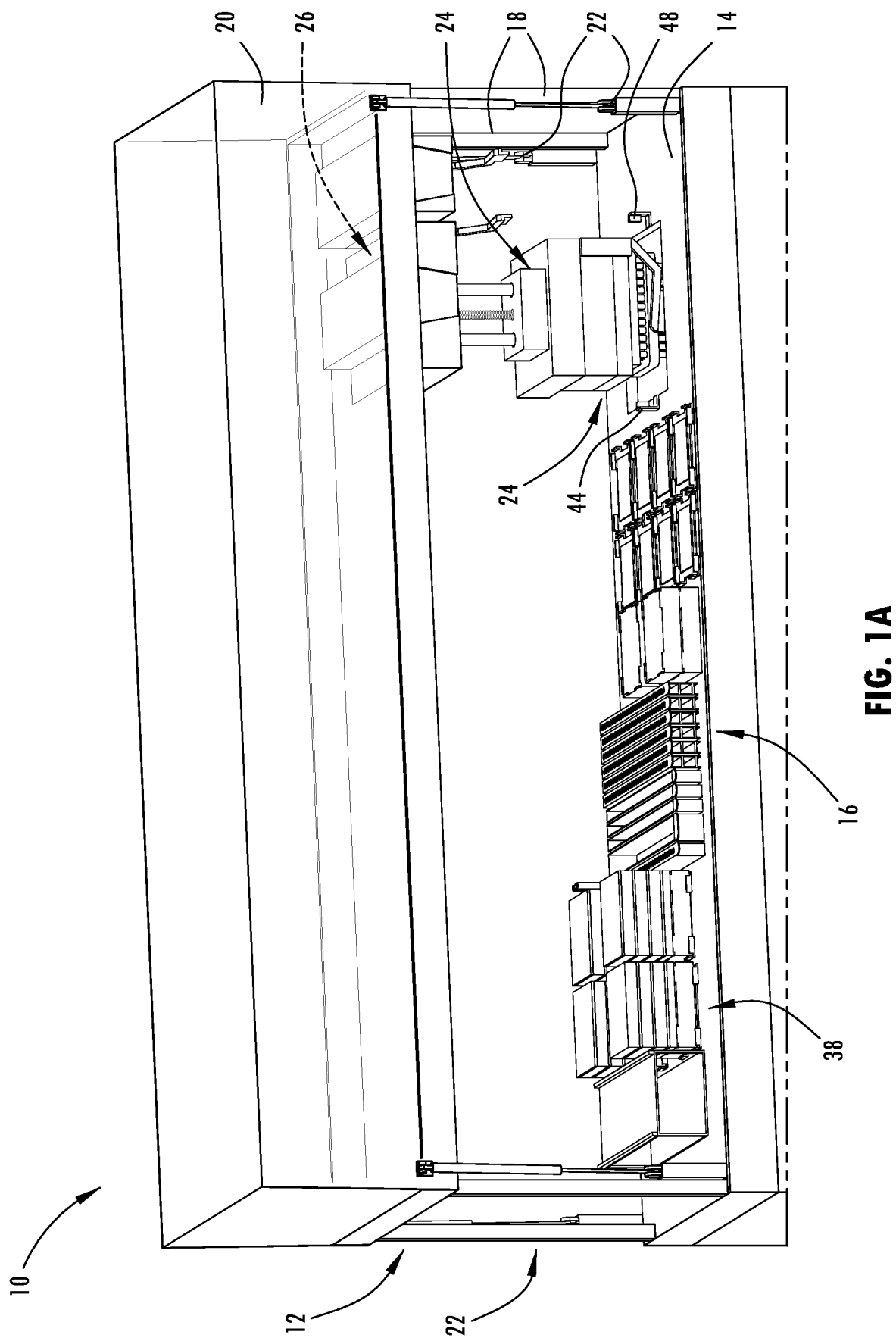
FIG. 1A is a side view of an exemplary liquid handling robot.
Figure 1B:
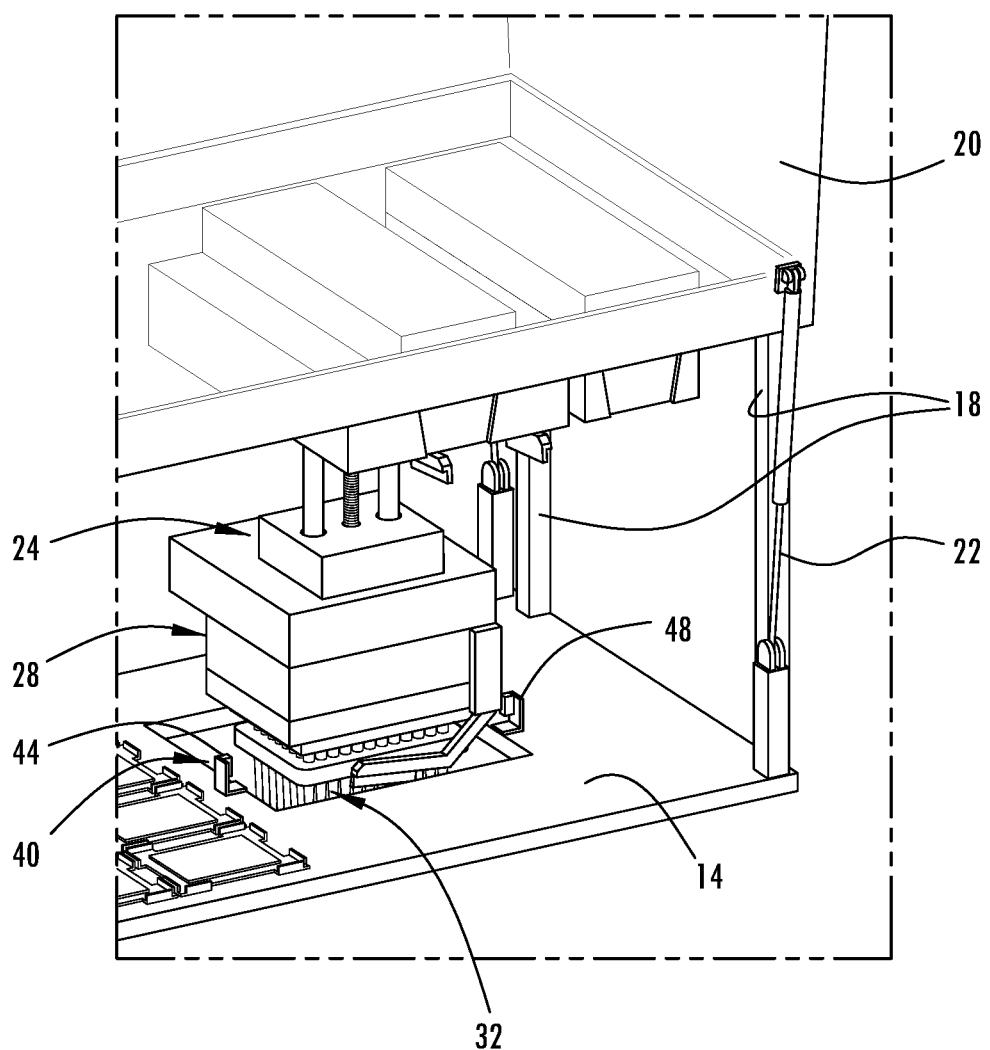
FIG. 1B is an upper perspective view of an end section of the liquid handling robot of FIG. 1A.

Referring to FIGS. 1A and 1B, a liquid handling robot 10, in some implementations, has a station structure 12 with a worktable 14 that is configured to support integrated and non-integrated devices (e.g., shakers, incubators) as well as labware, such as liquid containers 16, including microplates, deep-well plates, tubes, and the like. The station structure in other examples may have various sizes and designs to accommodate different types of lab testing, capacities, and demand.

As shown in FIG. 1A, the station structure 12 includes a frame 18 that surrounds the worktable 14 and supports a transparent cover 20 that prevents dust and contaminants from interfering with the worktable 14 and devices and labware present on the worktable 14. The transparent cover 20 also serves as a safety barrier to prevent injury during operation. The transparent cover 20 or a front portion thereof may be raised and lowered, such as with the assistance of pneumatic cylinders 22 to allow a user to access the worktable 14 and its contents, such as for preparing an experiment before operation of the system. The frame 18 also supports the robotic arm 24 suspended above the worktable 14. As shown in FIG. 1A, the liquid handling robot 10 has a cartesian actuation assembly 26 that supports the arm 24 and is similarly suspended above the worktable 14. The arm 24 operates to move over the worktable 14, such as via the cartesian actuation assembly 26, in a horizontal plane (x-y directions) that is generally parallel to the surface of the worktable. In doing so, the arm 24 is capable of operating at a desired location in the station structure 12. The arm 24 also operates to move vertically (z direction) relative to the worktable 14 to position an engagement head 28 of the arm 24 at the desired position. In additional implementations, the robotic arm may be supported operated with various different structures and mechanisms.

Figure 2:
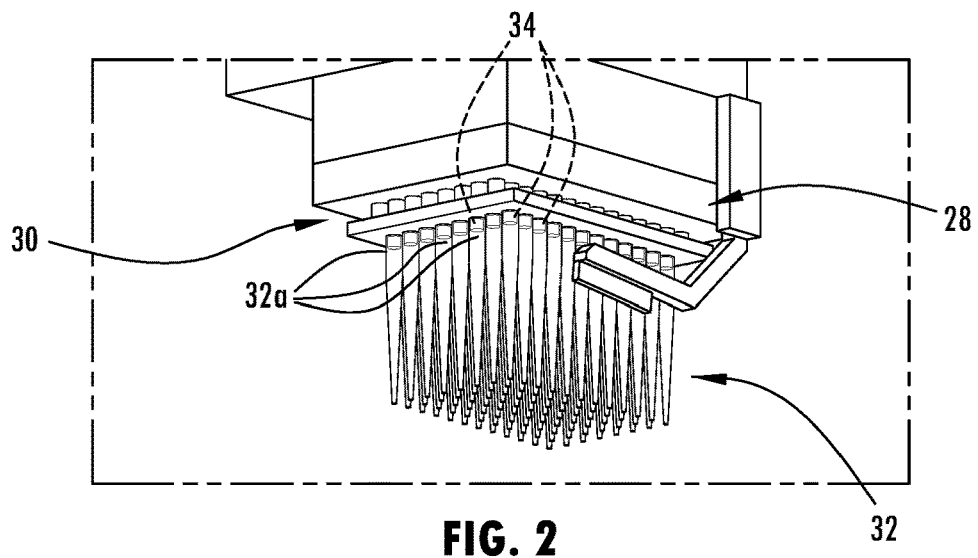
FIG. 2 is a lower perspective view of the liquid handling robot of FIG. 1A, showing pipette tips engaged with a robotic arm.

As shown in FIG. 2, the engagement head 28 of the arm 24 includes a tip receiver 30 that is configured to engage a set of pipette tips 32. The tip receiver 30 may include several mounting ports 34 that are each configured to engage a pipette tip. The tip receiver 30 has 96 mounting ports 34 to hold 96 pipette tips, such that the arm 24 may be referred to as a multi-channel arm (MCA). However, additional implementations of the arm and tip receiver may have more or few ports to hold a corresponding number of pipette tips, such as 8, 16, 48, 64, or 386 tips. As shown in FIG. 2, the mounting ports 34 have a portion that is inserted into a proximal end 32a of the pipette tip 32 and engaged to the mounting port 34. The engagement of pipette tips with mounting ports or other forms of tip receivers may be frictional and/or mechanical engagement that is releasable. The tip receivers also include an ejector to disengage the pipette tips from the engagement head, such as after liquid is transferred in the pipettes and clean pipette tips are needed for further operations.

Referring again to FIGS. 1A and 1B, a rack 36 that holds a set of pipette tips 32 is disposed at a home position in the station structure 12, such as at a desired location on the worktable 14. The rack 36 may be disposed in a stack of racks 38, such as shown in FIG. 1A. The rack 36 accessed by the robotic arm 24 may be disposed on top of the stack of racks 38, such as to facilitate access to pipette tips from the top of the rack in the stack. Each rack in the stack of racks 38 may hold a new set of pipette tips. When the pipette tips from the upper-most rack are engaged with the arm 24, the (now empty) top rack has to be removed by the arm to expose the next rack (holding another set of tips). The empty rack may also be removed with a secondary arm or other device, such as during operation of the arm carrying the pipette tips. It is also contemplated that other examples may have a mechanism, such as a shuttle retriever, to remove a bottom rack in a stack for access by the arm. The location of the stack of racks may be referenced as a loading area for loading or otherwise engaging the pipette tips onto the arm.

The controller 39 (FIG. 9) of the liquid handling robot 10 may utilize data processing hardware and memory hardware in communication with the data processing hardware. The memory hardware stores instructions that when executed on the data processing hardware cause the data processing hardware to perform operations of the controller 39. In some implementations, the robotic arm is connected to an on-board embedded controller 39 that runs the appropriate firmware. This unit is capable of processing machine commands. The liquid handling scripts are written in the client (PC) application 41, which translates it to machine commands. The controller 39 thereby is configured to control movement of the arm 24 relative to the worktable 14, such that the controller is configured to move the arm 14 to a position above the rack 36. With the arm in this elevated position, the controller can control the liquid handling robot 10 to engage the tip receiver 30 with the set of pipette tips 32 held in the rack, and then raise the tip receiver away from the home position, such as upward away from the stack of racks, to withdraw the engaged set of pipette tips from the (now empty) rack. The controller can then control the liquid handling robot to move the engaged set of pipette tips to an operating locations, such as a liquid container or other device or labware on the worksurface to draw liquid from the liquid container into at least one tip of the set of pipette tips engaged with the tip receiver.

Figure 3A:
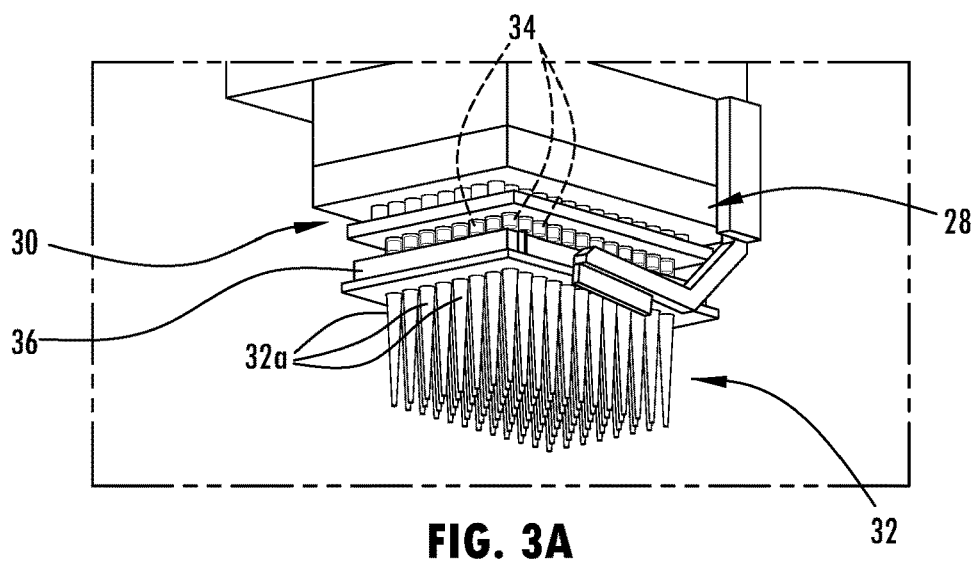
FIG. 3A is a lower perspective view of the liquid handling robot of FIG. 1A, showing a rack stuck on the pipette tips engaged with the robotic arm.
Figure 3B:
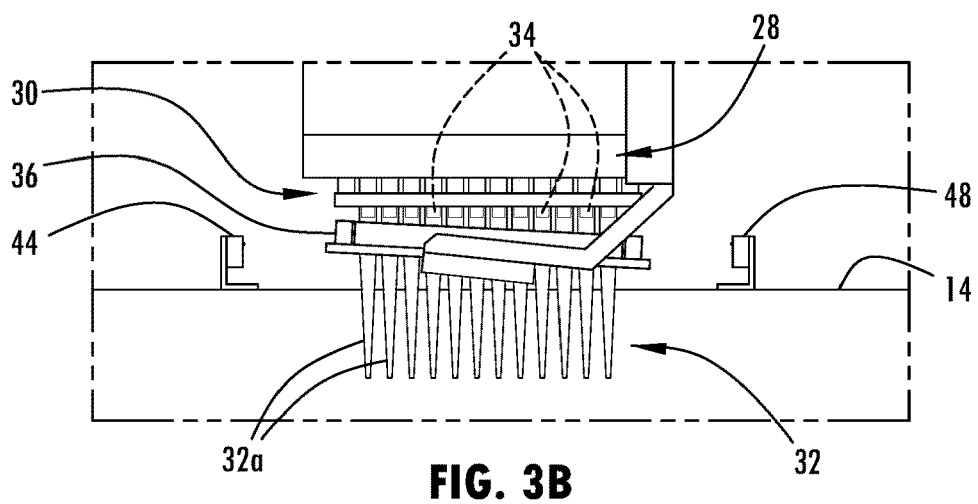
FIG. 3B is a side view of the rack stuck on the pipette tips, taken from an end of the liquid handling robot.

As shown in FIGS. 3A and 3B, the set of pipette tips 32 engaged with the tip receiver 30 can frictionally engage or stick to the rack 36 when being withdrawn, which can cause the rack 36 to be held by or jammed with the tips 32 in a jammed condition. The planar extent of the rack 36 in the jammed condition is often canted at an angle that is not horizontal or otherwise aligned with the worktable, such as shown in FIG. 3B. In the canted angle, the openings in the rack 36 that hold the pipette tips are frictionally engaged with the side surfaces of the pipette tips.

Figure 4A:
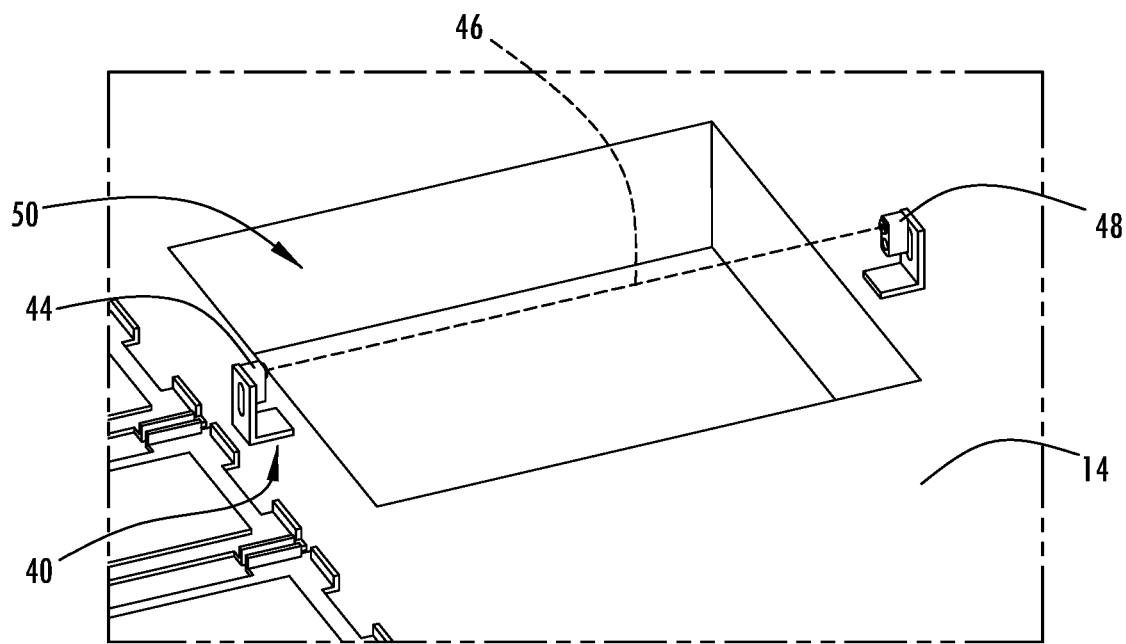
FIGS. 4A and 4B are upper perspective views of a sensor disposed at a worktable of the liquid handling robot of FIG. 1A.
Figure 4B:
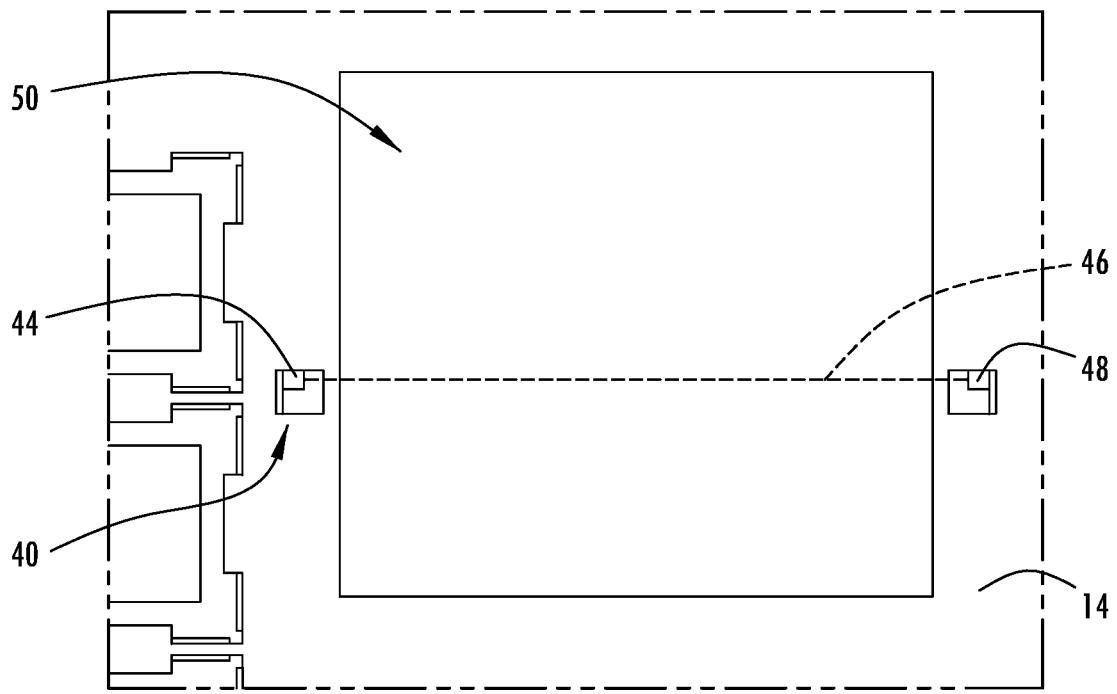

The system is provided with a sensor 40, such as at the station structure or the arm of the robot, to detect when the rack 36 in the jammed condition. As shown in FIGS. 4A and 4B, the sensor 40 is coupled to the station structure 12, and more specifically, the sensor 40 is fixed at the worktable 14. The sensor 40 shown in FIGS. 4A and 4B is a infrared break-beam sensor that has an emitter 44 configured to emit a light beam 46 and a photoelectric receiver 48 configured to receive the light beam. In additional examples it is contemplated that the sensor may include an ultrasonic sensor, an inductive sensor, a capacitive sensor, or an alternative infrared sensor, such as a passive infrared (PIR) sensor. However, inductive and capacitive sensing may not perform well with exclusively polymer pipette tips.

Figure 8:
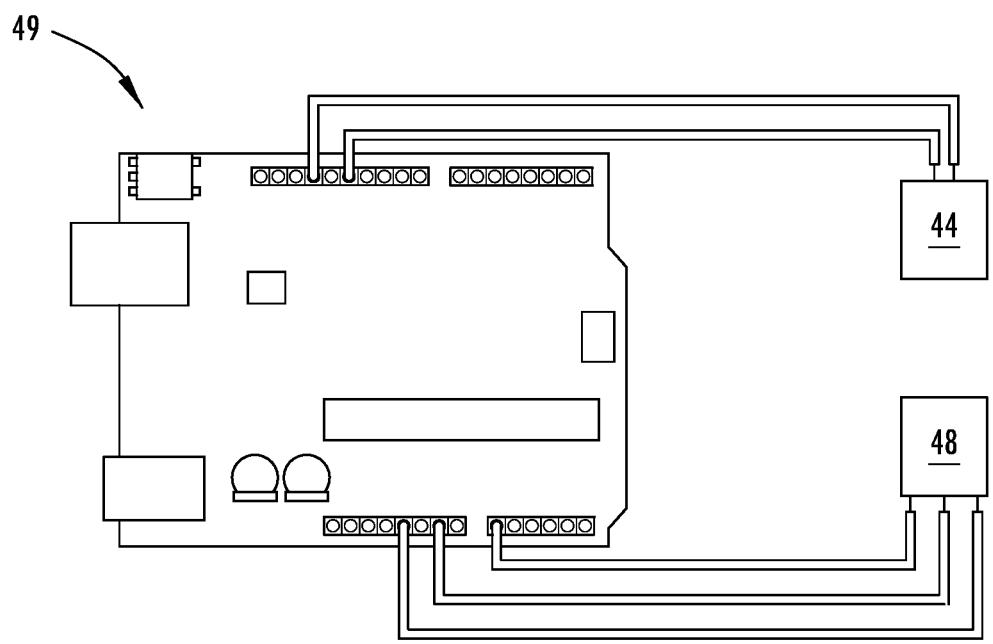
FIG. 8 is a schematic view an exemplary microcontroller connected to an infrared sensor.

After the tip receiver 30 engages the set of pipette tips 32 held in the rack 36 and the engaged tips 32 are raised from the home position, the beam 46 of the sensor 40 is positioned to contact the rack 36 in the jammed condition. A microcontroller 49, such as shown in FIG. 8, is coupled with the sensor 40 and the controller of the liquid handling robot (such as by interfacing with a PC that communicates with the controller), where the microcontroller 49 is configured to monitor the sensor 40 to determine if the rack 36 is in the jammed condition (FIGS. 6A-6C) or a cleared condition (FIGS. 5A-5C) where the beam 46 is uninterrupted by the rack 36. In some implementations, the controller is configured to move the tip receiver to a checking position relative to the beam for the microcontroller to monitor the sensor and determine if the rack is in the jammed condition or the cleared condition. The microcontroller may monitor the sensor for a select number of iterations (e.g., a set period of time) with the tip receiver held in the checking position. The microcontroller may be connected to receive digital or analog signals from the sensor. In the case of digital signal transmission, threshold checking may be absent from processing the signal. However, in some implementations, such as with the use of a transparent rack, an analog sensor signal may be checked against a threshold value to determine the presence of the rack. The microcontroller may be connected to or otherwise interface with the PC, which then translates commands to the on-board controller in machine commands.

Figure 5A:
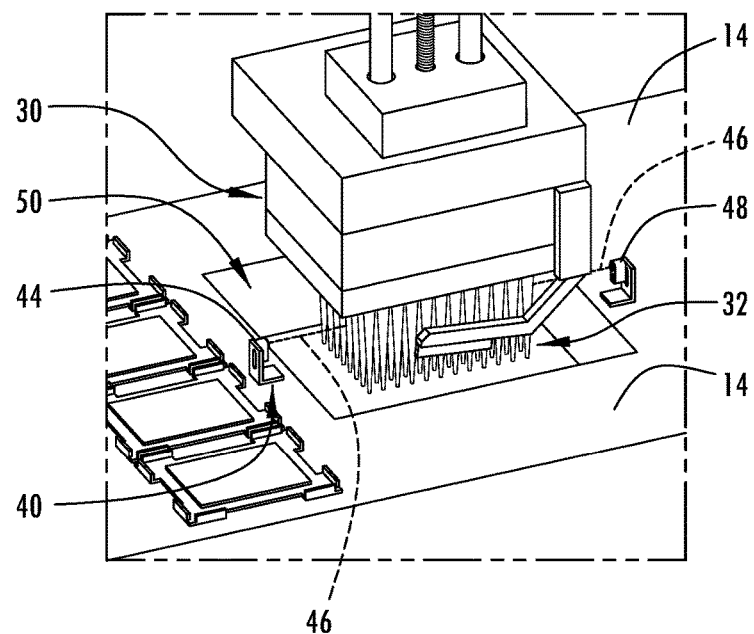
FIG. 5A is an upper perspective view of the robotic arm holding the engaged pipette tips in a checking position relative to the sensor shown in FIGS. 4A-4B.
Figure 5B:
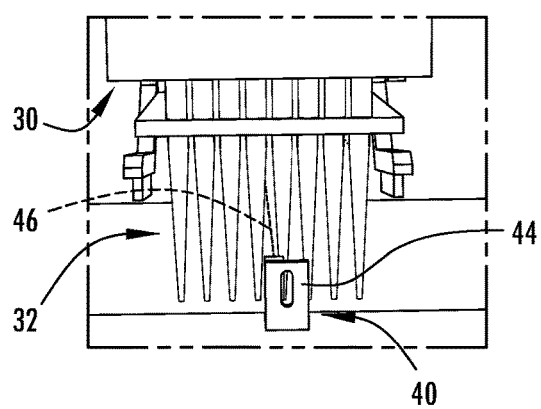
FIG. 5B is a side view of the robotic arm in the checking position shown in FIG. 5A, taken in alignment with a transmitted beam of the sensor.
Figure 5C:
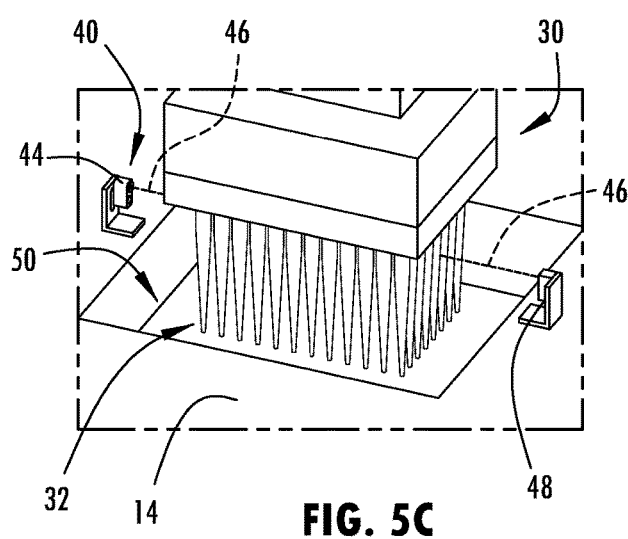
FIG. 5C is an upper perspective view of the robotic arm in the checking position shown in FIG. 5A, showing the transmitted beam traversing the pipette tips.
Figure 6A:
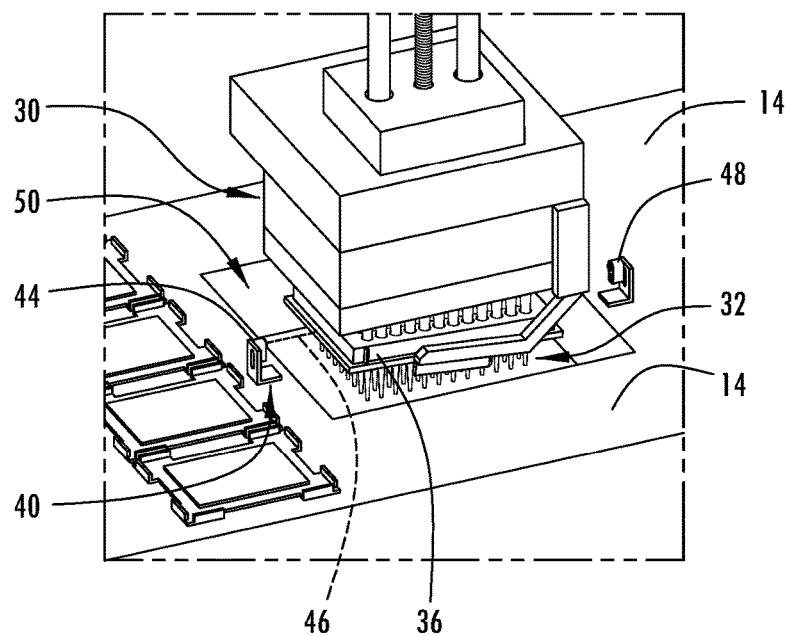
FIG. 6A is an upper perspective view of the rack stuck on the pipette tips engaged with the robotic arm held a checking position.
Figure 6B:
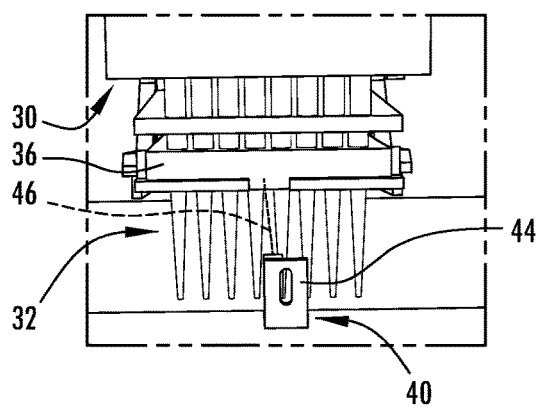
FIG. 6B is a side view of the robotic arm in the checking position shown in FIG. 6A, taken in alignment with the transmitted beam of the sensor.
Figure 6C:
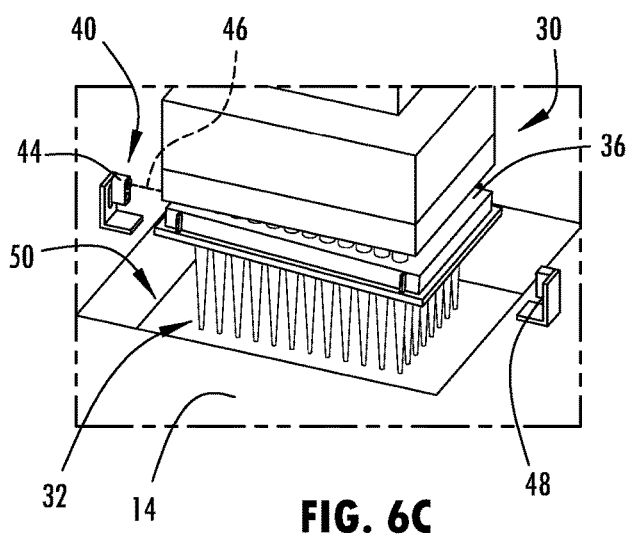
FIG. 6C is an upper perspective view of the robotic arm in the checking position shown in FIG. 6A, showing the transmitted beam contacting the rack.

As also shown in FIGS. 4A and 4B, the worktable 14 may include an opening or cutout that exposes a cavity 50, where the sensor 40 may be positioned for the beam 46 to extend across the opening in a cleared condition (FIGS. 5A-5C). The arm may lower the plurality of pipette tips at least partially into the cavity to determine if the rack is in the jammed or error condition (FIGS. 6A-6C). In doing so, the sensor 40 is provided in a relatively low location that does not interfere with the movement of the arm or operations on the worktable. This also provides a dedicated location for the detection, where the worktable cutout and cavity 50 of the liquid handler was used through which normally the centrifuge is accessed. On each side of the opening or cutout, the emitter 44 and the receiver 48 were placed facing each other, such as also shown a FIG. 7 with the receiver mounted between devices installed on the worktable.

In response to determining that the rack 36 is in the jammed condition, the microcontroller 49 is configured to signal or direct the liquid handling robot to perform a corrective action to disengage the rack 36 from the tip receiver 30. In this implementation, the signal or direction by the microcontroller is in response to a request from the controller. As such, the operational logic is implemented on the liquid handler's controller. In the liquid handling script, the arm is moved to the checking position and a call is made to run or otherwise operate the executable script on the PC that communicates and interfaces with the microcontroller. While the controller waits for the response from the executable script (and in turn the microprocessor), the microcontroller operates to determine whether the rack is stuck, whether a corrective action should be performed, or whether to continue the script.

The corrective action may include returning the rack to the loading area. For example, the corrective action may include releasing or disengaging the set of pipette tips from the tip receiver (such as with the ejector) over and into the rack, reengaging the set of pipette tips with the tip receiver, and again raising the tip receiver to withdraw the reengaged set of pipette tips from the rack. After the tips are reengaged, the corrective action includes checking if a jammed or error condition is still present. Thus, the corrective action may include iteratively releasing and reengaging the set of pipette tips with the tip receiver for the lesser of a set number of iterations or until the rack is no longer sensed in a jammed condition. The set number of iterations may, for example, be less than 10, such as 5.

Figure 7:
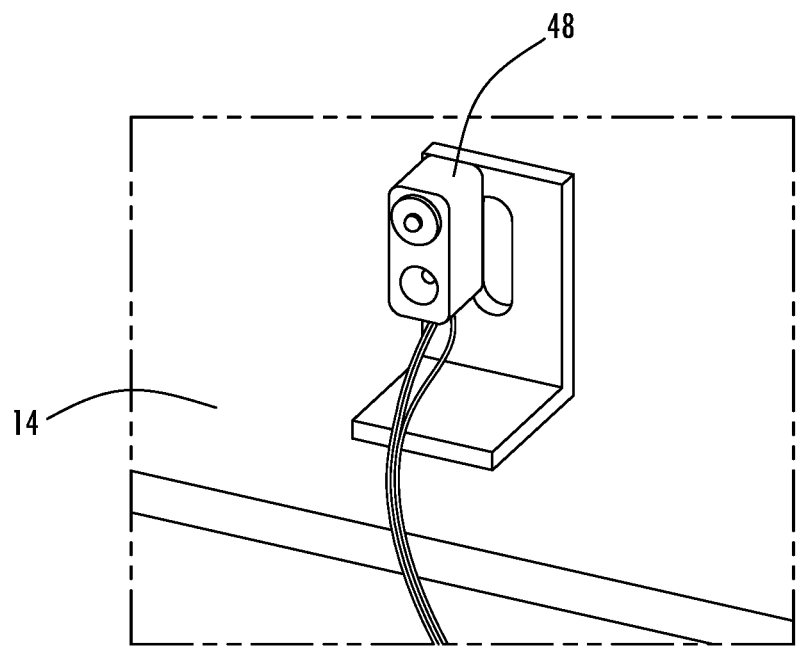
FIG. 7 is a perspective view of an additional sensor mounting location.

As shown in FIG. 7, as a dedicated location for detection, the worktable cutout of the liquid handler was used through which normally the centrifuge is accessed. On each side of the cutout, the emitter 44 and the receiver 48 were placed facing each other. FIG. 7 shows the mount of the receiver 48.

For the infrared break-beam sensor, HD-DS25CM-3MM was selected, which has the following parameters:
Sensing Distance: Approx 25 cm/10"
Power Voltage: 3.3-5.5 VDC
Emitter Current Draw: 10 mA @ 3.3V, 20 mA @ 5V
Output Current Capability of receiver: 100 mA sink
Transmitter/Receiver LED Angle: 10°
Response Time: <2 ms
Dimensions: 20 mm×10 mm×8 mm/0.8"×0.4"×0.3"
Cable Length: 234 mm/9.2"
Weight (of each half): ~3 g As an interface between the sensor and the computer, a microcontroller of type Arduino UNO SMD REV3 MCU A000073 was used, which has the following parameters:
ATmega328P Microcontroller 14× digital I/O pins (6 can be used as PWM outputs)
6× Analog inputs
16 MHz quartz crystal
1×USB
1× power jack (5.5 mm/2.1 mm, 7-12V)
1×ICSP header
1× reset button
Operating voltage: 5 V FLASH memory: 32 KB
SRAM: 2 K
EEPROM: 1 K
Size: 68.6×53.4 mm As can be seen in FIG. 8, the LED was wired to a digital output, which enables it to be switched on only for the duration of the measurement, instead of keeping it constantly on. The current draw is specified at a maximum of 20 mA, which is exactly the same as the maximum current draw on a digital output of the Arduino, both specified for 5V. Measurements showed, that the actual draw of the LED was around 12 mA, therefore, powering it directly from a digital output for short durations can be considered safe. The receiver is an open collector phototransistor, which means, that the data pin is drawn to ground, when IR light from the emitter hits the sensor. To read the value of the sensor, the data pin may be connected to an analog input of the microcontroller.

Figure 9:
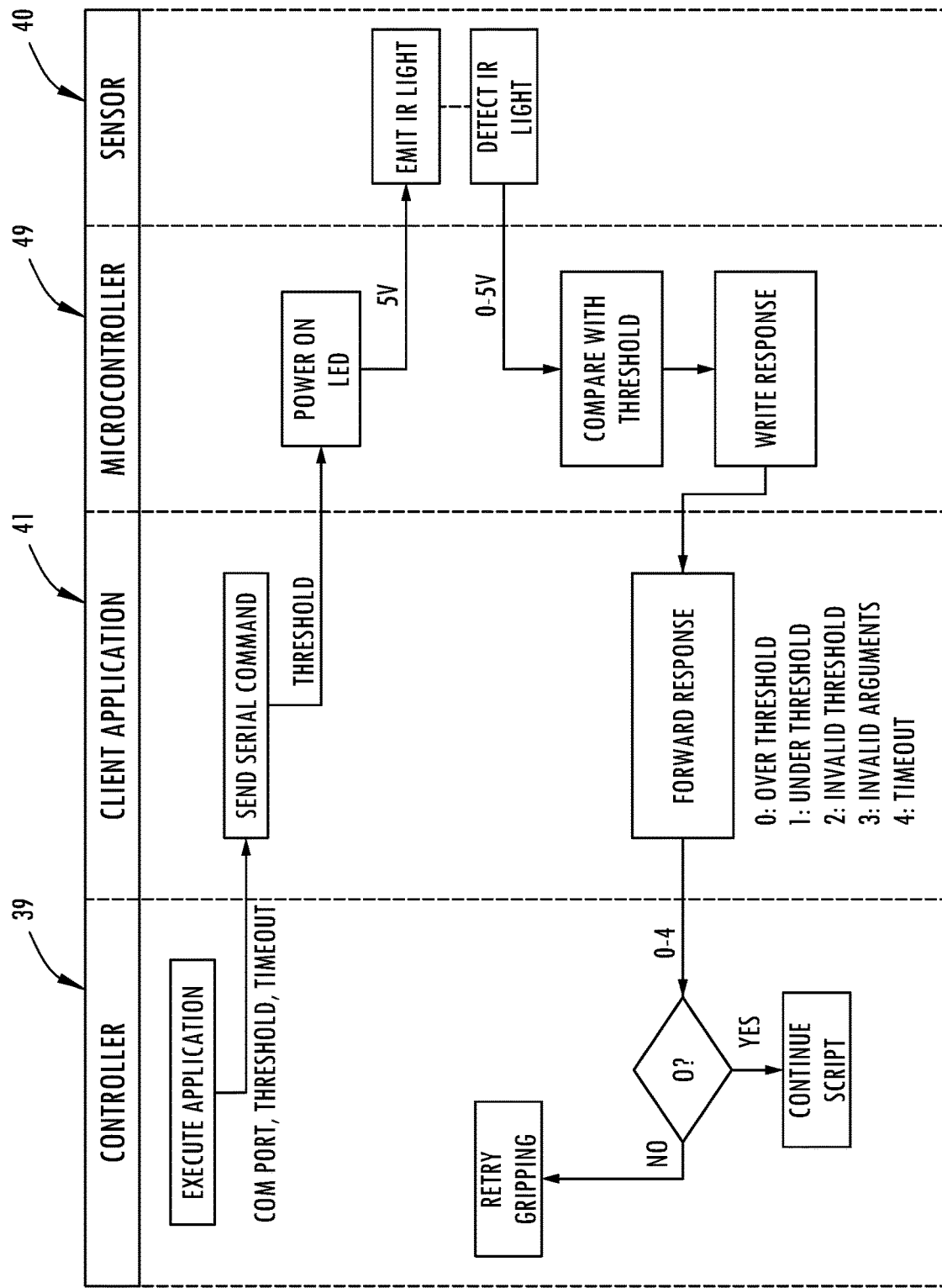
FIG. 9 is a chart illustrating exemplary communication layers.

As shown in FIG. 9, two layers of software enable communication between the liquid handler software (EVOware) and the sensor. Handling digital or analogue signal inputs directly with the EVO require modifying the firmware of the robot and writing a driver for EVOware. Instead, to avoid system modifications, the built-in command of EVOware was used for executing a custom client application, which communicates with the microcontroller. The microcontroller is responsible of activating the sensor and reading the value. The process is started by EVOware script, where a numeric variable is defined to store the result, then the Execute Application command is used to call the client application with the appropriate parameters, such as:
port_name: name of the communications port
command:
0-1023: threshold
"view": initiates continuous reading till the timeout is reached for debugging purposes
timeout: value in seconds The call example above means, that COM port 1 will be used to initiate a measurement and wait for the response for 20 seconds. The threshold of 255 is compared to the eight-bit reading of the analogue sensor value, and depending on the result, the following response is given to EVOware:
0: Measured value is over the threshold
1: Measured value is under the threshold
2: The received answer was invalid
3: Invalid number of arguments
4: Timeout The client application is responsible of communicating with the microcontroller through a serial port, such as shown in FIG. 8. As an integrated development environment (IDE), the Microsoft Visual Studio 2019 Community Edition was used, and the application was written in C++ language. To handle the communication, an Arduino-specific serial communications library was utilized, which uses the Device Control Block (DCB) structure.

The program starts by checking and parsing the arguments, then it waits for connection till the timeout is reached, in which case it exits with an error. If the connection is successfully established, the command is sent to the microcontroller. The answer is processed in a bytewise manner, and is terminated, when a newline character is received. The message is interpreted, and the program returns with the appropriate value.

As the deepest level of the detection system, the microcontroller program waits for bytes on the serial port and reads them until a newline character is received. If the incoming command is a valid number, it is interpreted as a threshold, and normal measurement mode is started. In this mode, two hundred measurements are performed in the course of two seconds, and the average is calculated to minimize the effect of noise. The result is compared to the threshold, and the appropriate response is written to the serial port. The view mode, on the other hand, provides the user a possibility to determine an appropriate threshold by looking at the measured value in various situations. In certain applications, for example when a semitransparent object has to be detected, a different threshold can be desired, as for a completely nontransparent object.

Figure 10:
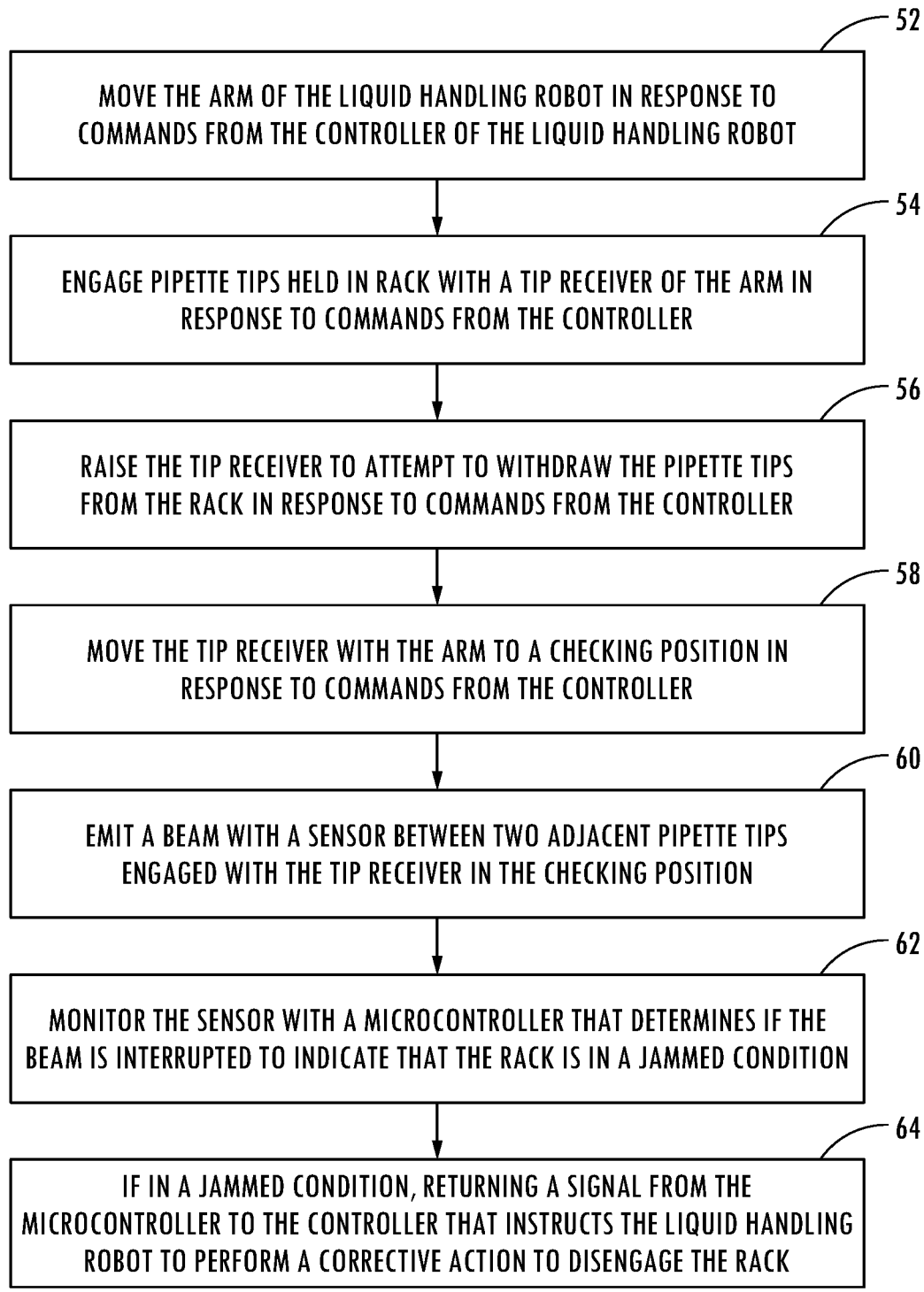
FIG. 10 is flow chart of an exemplary method of checking for a jammed condition of a rack at a robotic arm of a liquid handling robot.

As shown as an example in FIG. 10, a method of operating the liquid handling robotic system provides first moving the arm of the liquid handling robot relative to a worktable with a commands (such as machine commands) transmitted from the controller of the liquid handling robot, such as shown at step 52. At step 54, in response to commands from the controller, a set of pipette tips that are held in a rack disposed on the worktable are engaged with a tip receiver at a disposed at the lower portion of the arm. In response to further commands from the controller, at step 56 the tip receiver is raised away from the worktable to attempt to withdraw the set of pipette tips from the rack. The tip receiver is then moved with the arm to a checking position at step 58. At the next step 60, a beam is emitted with an infrared sensor in an area between an adjacent pair of the set of pipette tips engaged with the tip receiver (with the tip receiver still in the checking position). The sensor is then monitored with a microcontroller at step 62 to determine if the beam is interrupted to indicate that the rack is in a jammed condition on the set of pipette tips. In response to determining that the rack is in the jammed condition, at step 64 a signal is returned from the microcontroller to the controller that instructs the liquid handling robot to perform a corrective action to disengage the rack from the jammed condition on the set of pipette tips.

In another implementation of the liquid handling robotic system, a liquid testing assembly is provided that has a filter tube and a centrifugal tube that is engaged with the filter tube. The filter tube is removed from the centrifugal tube and may be disposed in a home location at the worktable. The arm includes an engagement device that is configured to engage the filter tube of the liquid testing assembly and to move the engaged filter tube away from the home location. A sensor is configured to emit a field and sense interruptions to the field. The sensor is positioned to sense the presence of the filter tube after the arm moves the filter tube away from the home location. The microcontroller is configured to monitor the sensor to determine an error condition when the filter tube is not sensed. In response to a determined error condition, the liquid handling robot is programmed to iteratively perform a corrective action to engage the filter tube for the lesser of a set number of iterations or until the desired condition is determined by the microcontroller.

For purposes of this disclosure, the term "coupled" (in all of its forms, couple, coupling, coupled, etc.) generally means the joining of two components directly or indirectly to one another. Such joining may be stationary in nature or movable in nature; may be achieved with the two components and any additional intermediate members being integrally formed as a single unitary body with one another or with the two components; and may be permanent in nature or may be removable or releasable in nature, unless otherwise stated.

Also for purposes of this disclosure, the terms "upper," "lower," "right," "left," "rear," "front," "vertical," "horizontal," and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

A number of implementations have been described. Nevertheless, it will be understood that various modifications may be made without departing from the spirit and scope of the disclosure. Accordingly, other implementations are within the scope of the following claims.

What is claimed is:

1. A liquid handling robotic system comprising:
a frame disposed at a worktable;
a liquid testing assembly comprising a first component and a second component engaged with the first component, the liquid testing assembly disposed in a home location at the worktable;
a liquid handling robot operably coupled to the frame and comprising a controller and an arm operable to move relative to the worktable in response to commands from the controller, the arm comprising an engagement device that is configured to engage the first component of the liquid testing assembly;

wherein the controller is configured to control the engagement device to engage the first component in the home location and control the arm to move the engaged first component away from the home location;

a sensor configured to emit a field and sense interruptions to the field, the sensor coupled to the frame, the worktable, or the arm of the liquid handling robot and positioned to sense the presence of the second component when it remains engaged with the first component after the arm moves the first component away from the home location; and a microcontroller coupled with the sensor and the controller of the liquid handling robot, the microcontroller configured to perform a first measurement sequence with the arm holding the first component in a first position relative to the sensor for a set period of time and a second measurement sequence with the arm holding the first component in a second position relative to the sensor for a set period of time, and monitor the sensor to determine an error condition when the second component is sensed in engagement with the first component or a cleared condition where the second component is not sensed, and in response to a determined error condition, direct the liquid handling robot to iteratively perform a corrective action to disengage the second component from the first component for the lesser of a set number of iterations or until a cleared condition is determined by the microcontroller.

2. The liquid handling robotic system of claim 1, wherein the corrective action comprises disengaging the first component, reengaging the first component, and directing the microcontroller to check if an error condition is still present.

3. The liquid handling robotic system of claim 2, wherein the set number of iterations is less than 10.

4. The liquid handling robotic system of claim 1, wherein the microcontroller monitors the sensor for the first and second measurement sequences and determines an error condition if the second component is sensed in the first or second measurement sequence.

5. The liquid handling robotic system of claim 1, wherein when the microcontroller receives a signal from the sensor below a threshold value, the signal is indicative of the second component erroneously engaged to the first component.

6. The liquid handling robotic system of claim 1, wherein when the microcontroller receives a signal from the sensor that exceeds a threshold value, the signal is indicative of the first component not being engaged to the second component.

7. The liquid handling robotic system of claim 1, wherein the sensor comprises at least one of an infrared sensor, an ultrasonic sensor, an inductive sensor, or a capacitive sensor.

8. The liquid handling robotic system of claim 1, wherein the frame comprises a loading area for the testing component assembly that is accessible by the arm to engage the first component, and wherein the liquid handling robot returns the second component to the loading area when the microcontroller determines an error condition.

9. The liquid handling robotic system of claim 1, wherein the sensor comprises an emitter configured to emit a light beam and a photoelectric receiver configured to receive the light beam, the emitter configured to be positioned for the light beam to be adjacent to the first component when engaged with an engagement head and to be interrupted by the second component when the first component is engaged with the second component.

10. The liquid handling robotic system of claim 9, wherein the sensor is fixed relative to the frame, and wherein the arm is configured to move the first component engaged with the engagement device to a checking position with the light beam arranged to contact the second component in an error condition.

11. The liquid handling robotic system of claim 10, wherein when determining whether the second component is in the error condition, the microcontroller is configured to monitor the sensor for a predefined time with the engagement head in the checking position.

12. A system comprising:
a liquid handling robot comprising:
a worktable configured to support a rack holding a set of pipette tips;
an arm operably suspended above the worktable, the arm having a tip receiver that is configured to engage the set of pipette tips; and
a controller configured to control movement of the arm relative to the worktable to a position above the rack, control the tip receiver to engage the set of pipette tips held in the rack, and raise the tip receiver away from the worktable to withdraw the engaged set of pipette tips from the rack;
a sensor fixed relative to the worktable and operable to emit a beam, the sensor configured to sense interruptions to the beam; and
a microcontroller coupled with the sensor and the controller of the liquid handling robot, the microcontroller configured to:
determine when the arm is moved to a checking position that locates the beam in an area between an adjacent pair of the set of pipette tips engaged with the tip receiver;
monitor the sensor with the arm in the checking position to determine if the rack interrupts in the beam to indicate a jammed condition of the rack, wherein the microcontroller receiving a signal from the sensor below a threshold value is indicative of the rack being engaged in the jammed condition; and
in response to determining that the rack is in the jammed condition, direct the liquid handling robot to perform a corrective action to disengage the rack from the set of pipette tips.

13. The system of claim 12, wherein the corrective action comprises releasing the set of pipette tips from the tip receiver over the rack, reengaging the set of pipette tips from the rack with the tip receiver, and checking if a jammed condition is still present.

14. The system of claim 12, wherein the corrective action comprises iteratively releasing and reengaging the set of pipette tips with the tip receiver for the lesser of a set number of iterations or until the rack is no longer sensed in a jammed condition.

15. The system of claim 12, wherein the sensor comprises an infrared break-beam sensor having an emitter configured to emit the beam and a photoelectric receiver configured to receive the beam.

16. The system of claim 15, wherein the worktable comprises an opening exposing a cavity, the sensor positioned for the beam to extend across the opening in a cleared condition.

17. The system of claim 12, wherein the microcontroller monitors the sensor with the arm in the checking position for a select number of iterations.

18. The system of claim 12, wherein the worktable comprises a loading area that holds a stack of racks, the rack having the set of pipette tips disposed at a top of the stack of racks.

19. A liquid handling robotic system comprising:
a frame disposed at a worktable;
a liquid testing assembly comprising a first component and a second component engaged with the first component, the liquid testing assembly disposed in a home location at the worktable;
a liquid handling robot operably coupled to the frame and comprising a controller and an arm operable to move relative to the worktable in response to commands from the controller, the arm comprising an engagement device that is configured to engage the first component of the liquid testing assembly;
wherein the controller is configured to control the engagement device to engage the first component in the home location and control the arm to move the engaged first component away from the home location;
a sensor configured to emit a field and sense interruptions to the field, the sensor coupled to the frame, the worktable, or the arm of the liquid handling robot and positioned to sense the presence of the second component when it remains engaged with the first component after the arm moves the first component away from the home location, the sensor fixed relative to the frame and comprising an emitter configured to emit a light beam and a photoelectric receiver configured to receive the light beam, the emitter configured to be positioned for the light beam to be adjacent to the first component when engaged with an engagement head and to be interrupted by the second component when the first component is engaged with the second component, the arm configured to move the first component engaged with the engagement device to a checking position with the light beam arranged to contact the second component in an error condition; and
a microcontroller coupled with the sensor and the controller of the liquid handling robot, the microcontroller configured to monitor the sensor to determine an error condition when the second component is sensed in engagement with the first component or a cleared condition where the second component is not sensed, and in response to a determined error condition, direct the liquid handling robot to iteratively perform a corrective action to disengage the second component from the first component for the lesser of a set number of iterations or until a cleared condition is determined by the microcontroller.

20. The liquid handling robotic system of claim 19, wherein the corrective action comprises disengaging the first component, reengaging the first component, and directing the microcontroller to check if an error condition is still present.

21. The liquid handling robotic system of claim 19, wherein the sensor comprises at least one of an infrared sensor, an ultrasonic sensor, an inductive sensor, or a capacitive sensor.

22. The liquid handling robotic system of claim 19, wherein the frame comprises a loading area for the testing component assembly that is accessible by the arm to engage the first component, and wherein the liquid handling robot returns the second component to the loading area when the microcontroller determines an error condition.

23. The liquid handling robotic system of claim 19, wherein when determining whether the second component is in the error condition, the microcontroller is configured to monitor the sensor for a predefined time with the engagement head in the checking position.

24. A liquid handling robotic system comprising:
a frame disposed at a worktable;
a rack configured to hold a set of pipette tips at a home position relative to the frame;
a liquid handling robot operably coupled to the frame and comprising a controller and an arm operable to move relative to the worktable in response to commands from the controller, the arm comprising a tip receiver that is configured to engage the set of pipette tips from the rack;
wherein the controller is configured to move the arm to a position above the rack, engage the tip receiver with the pipette tips held in the rack, raise the tip receiver away from the home position to withdraw the engaged set of pipette tips from the rack;
a sensor configured to emit a field and sense interruptions to the field, the sensor coupled to the frame, the worktable, or the arm of the liquid handling robot wherein after the tip receiver engages the set of pipette tips held in the rack and the engaged tips are raised from the home position, the field is positioned to contact the rack in a jammed condition where the rack is frictionally engaged with the set of pipette tips engaged with the tip receiver; and
a microcontroller coupled with the sensor and the controller of the liquid handling robot, the microcontroller configured to monitor the sensor to determine if the rack is in a jammed or a cleared condition where the field is uninterrupted by the rack, and in response to determining that the rack is in the jammed condition, direct the liquid handling robot to iteratively perform a corrective action to disengage the rack from the tip receiver for the lesser of a set number of iterations or until a cleared condition is determined by the microcontroller.

25. The liquid handling robotic system of claim 24, wherein the corrective action comprises disengaging the rack, reengaging the rack, and directing the microcontroller to check if an error condition is still present.

26. The liquid handling robotic system of claim 24, wherein the sensor comprises an emitter configured to emit a light beam and a photoelectric receiver configured to receive the light beam, the emitter configured to be positioned for the light beam to be adjacent to the rack when engaged with the tip receiver and to be interrupted by the one of the pipette tips when the rack is engaged with the pipette tips.

27. The liquid handling robotic system of claim 26, wherein the sensor is fixed relative to the frame, and wherein the arm is configured to move the rack engaged with the tip receiver to a checking position with the light beam arranged to contact the pipette tips in an error condition.

28. The liquid handling robotic system of claim 27, wherein when determining whether the one of the pipette tips is in the error condition, the microcontroller is configured to monitor the sensor for a predefined time with the tip receiver in the checking position.

* * * * *